No. 848,528. PATENTED MAR. 26, 1907.
C. U. BARLOW.
COOKER.
APPLICATION FILED JUNE 2, 1906.

Witnesses

Inventor
C. U. Barlow,
By
Victor J. Evans
Attorney

UNITED STATES PATENT OFFICE.

CASSIUS U. BARLOW, OF OAKLAND, CALIFORNIA.

COOKER.

No. 848,528. Specification of Letters Patent. Patented March 26, 1907.

Application filed June 2, 1906. Serial No. 319,886.

*To all whom it may concern:*

Be it known that I, CASSIUS U. BARLOW, a citizen of the United States, residing at Oakland, in the county of Alameda and State of California, have invented new and useful Improvements in Cookers, of which the following is a specification.

This invention relates to cookers, the object of the invention being to provide a cooking device in the form of an oven which is practically air-tight, and composed of material which will insulate the interior of the receptacle from the outside atmosphere and serve to maintain for a long period of time the temperature within the same.

It is well understood that after vegetables and other products are thoroughly heated and partially cooked upon an ordinary stove or in an oven the cooking operation will continue, provided such partially-cooked products can be retained in an air-tight chamber and the temperature thereof maintained at a high point for a long time. Food treated in this manner is more thoroughly cooked and is rendered more wholesome and palatable, and is in every way more desirable than food subjected to the ordinary rapid cooking operation.

To this end the invention consists in the novel construction, combination, and arrangement of parts hereinafter more fully described, illustrated, and claimed.

Figure 1:
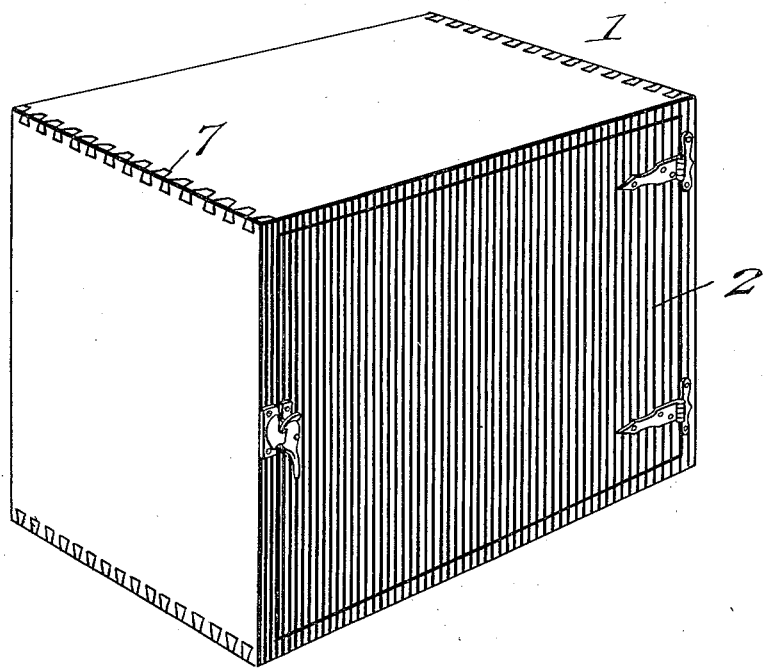
Figure 2:
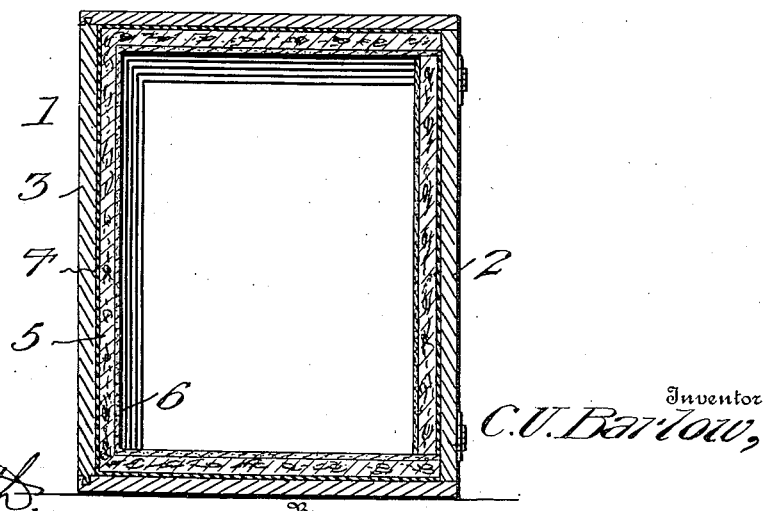

In the drawings, Figure 1 is a perspective view of a cooker embodying the present invention. Fig. 2 is a vertical sectional view of the same.

In the drawings I have shown a cooker of simple form, the same consisting of a box-like receptacle 1, provided at one side with a door 2 hinged thereto and provided with suitable fastenings means for retaining the door closed, any suitable method of rabbeting the door being employed to render the same air-tight.

Each of the walls of the receptacle or cooker, including the door thereof, embodies an outer thickness 3, which is composed of wood, a lining 4, of tarred paper, which is applied directly to the inner surface of the outer wall 3, a filling or additional thickness 5 of cork, and lastly an inside layer or thickness 6 of plaster, the said thicknesses being laid one upon the other in the order named, as shown in Fig. 2.

Under the preferred embodiment of this invention the sides, top, and bottom of the receptacle are connected or fastened together at the corners by dovetailing, as shown at 7, and at all other points, thus avoiding the use of nails or metallic fasteners, which are conductors of heat and cold.

A cooker constructed in the manner above described has been found by repeated tests to effectively insulate the interior of the cooker from the outside atmosphere and maintain the interior temperature at a high point, which will cause the cooking operation to continue for a sufficient period of time to thoroughly cook the material placed therein and render the same palatable, savory, and digestible.

I claim—

A cooker comprising a plurality of walls of which the outer wall is composed of wood, the adjoining wall of a layer of tarred paper, the next wall of a layer of cork, and the inner wall of a layer of plaster, substantially as and for the purpose described.

In testimony whereof I affix my signature in presence of two witnesses.

CASSIUS U. BARLOW.

Witnesses:
P. J. McMULLER,
A. H. UCOULD.